United States Patent [19]

Schoen

[11] Patent Number: 4,672,232
[45] Date of Patent: Jun. 9, 1987

[54] MICROPROCESSOR OPERATED TIMING CONTROLLER

[75] Inventor: Erich Schoen, St. Charles, Ill.

[73] Assignee: Pittway Corporation, Aurora, Ill.

[21] Appl. No.: 828,446

[22] Filed: Feb. 10, 1986

[51] Int. Cl.⁴ ............................................ H01H 43/02
[52] U.S. Cl. ................... 307/140; 307/132 R; 307/132 E; 307/141; 307/38; 364/141; 200/38 R
[58] Field of Search .................. 307/130, 132 E, 141, 307/141.4, 132 R, 590, 140; 340/309.4, 309.5, 309.1, 310 R, 310 A, 309.2; 364/140, 141, 142, 143; 200/38 F, 38 A, 38 FA, 38 FB, 38 D, 38 DA, 39 A, 38 R

[56] References Cited

U.S. PATENT DOCUMENTS

| | | | |
|---|---|---|---|
| 4,002,925 | 1/1977 | Monahan | 307/141 |
| 4,035,661 | 7/1977 | Carlson | 307/141 |
| 4,054,802 | 10/1977 | Mock | 307/38 |
| 4,104,541 | 8/1978 | Jewell | 307/141 |
| 4,110,632 | 8/1978 | Wyland | 307/141 X |
| 4,134,027 | 1/1979 | Scott et al. | 307/141 |
| 4,137,463 | 1/1979 | Scott et al. | 307/141 |
| 4,151,515 | 4/1979 | Pease et al. | 307/141 X |
| 4,198,574 | 4/1980 | Price et al. | 307/97 |
| 4,213,063 | 7/1980 | Jones | 307/141 |
| 4,344,000 | 8/1982 | Schornack et al. | 307/132 E |
| 4,349,748 | 9/1982 | Goldstein et al. | 307/132 E |
| 4,354,120 | 10/1982 | Schornack | 307/132 E |
| 4,521,843 | 6/1985 | Pezzolo et al. | 364/146 X |
| 4,540,984 | 9/1985 | Waldman | 307/132 E X |
| 4,570,216 | 2/1986 | Chan | 364/141 X |

Primary Examiner—William M. Shoop, Jr.
Assistant Examiner—Shik Luen Paul Ip
Attorney, Agent, or Firm—Emrich & Dithmar

[57] ABSTRACT

The timing controller includes a triac, a receptacle, and an AC wall outlet coupled in series. A sensor is coupled across the receptacle to sense when a lamp plugged therein is turned on or off. A microprocessor is coupled to the sensor circuit and stores each time the lamp is turned on and each time it is turned off. After twenty-four hours have lapsed, the microprocessor operates the electronic switch in accordance with the stored temporary program to turn the lamp on and off at the same times on each succeeding day. In the event of a power failure, the subsequent reapplication of power will cause the microprocessor to turn the lamp on and off for four-hour periods.

16 Claims, 4 Drawing Figures

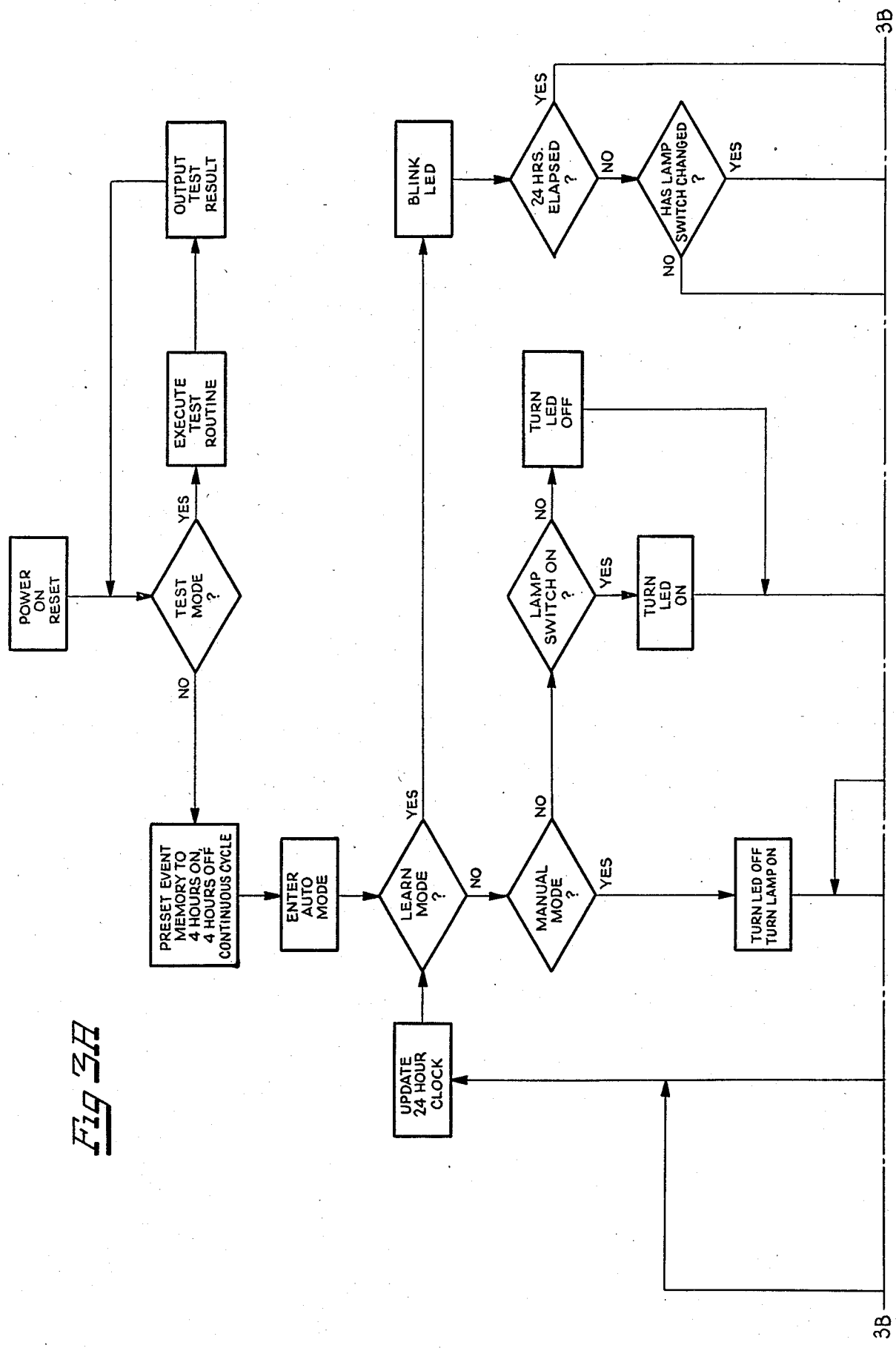

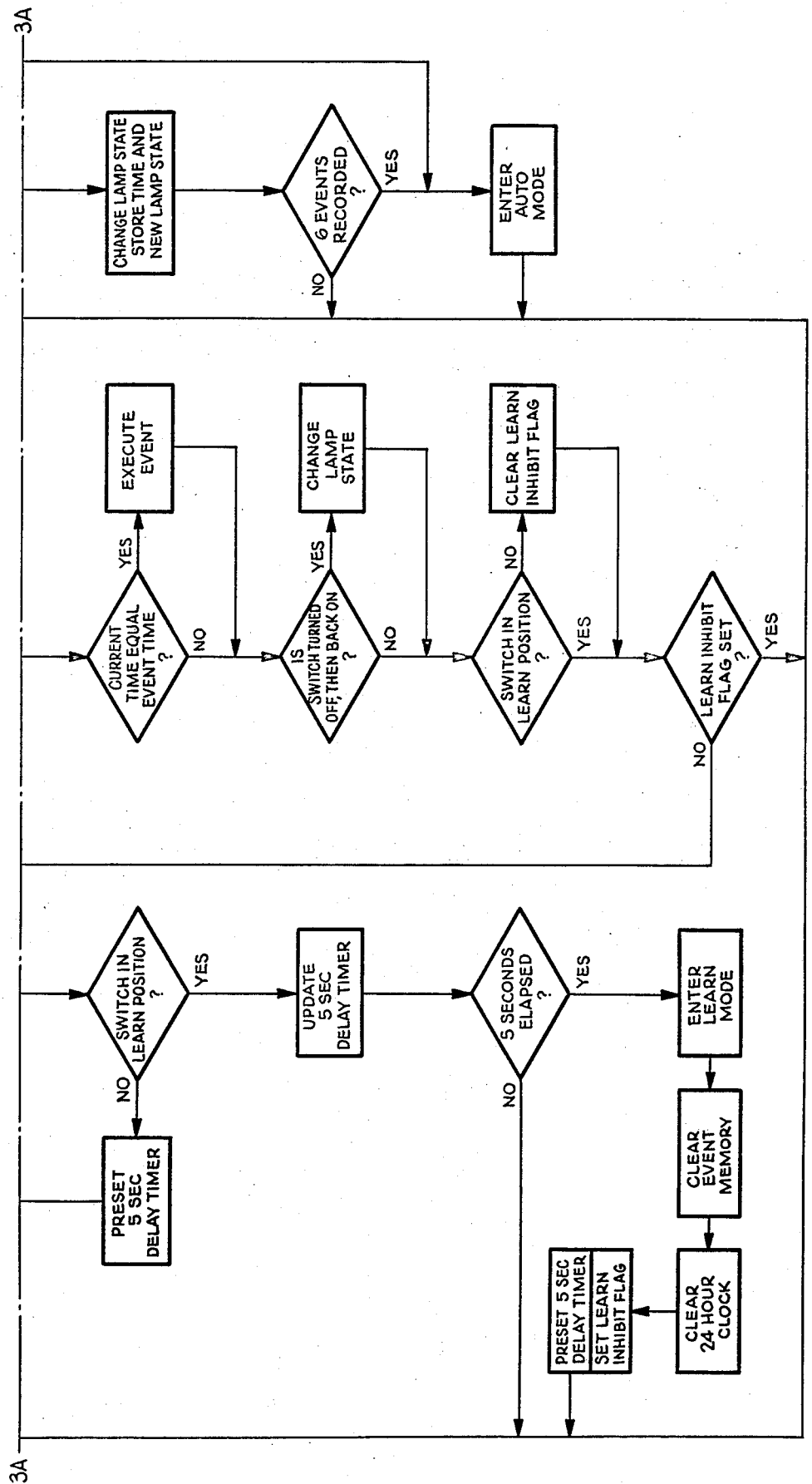

MICROPROCESSOR OPERATED TIMING CONTROLLER

BACKGROUND OF THE INVENTION

This invention relates to timing controllers used to turn on and turn off appliances (lamps usually) at selected times of the day. More specifically, the type of timing controller disclosed herein "learns" when the lamp is turned on and off during the first day and thereafter automatically turns the lamp on and off at the same times each succeeding day.

U.S. Pat. No. 4,349,748 to Goldstein et al. discloses such a device. In this patent, a lamp is coupled in series with the AC power supply and an electronic power switch. A sensor is coupled across the power switch and develops control signals during successive operation of the lamp pull chain. A control circuit renders the power switch conductive to turn the lamp on, or nonconductive to turn the lamp off, depending upon operation of the pull chain. The device includes its own, internal button that successively operates the power switch between its conductive and nonconductive states. It operates the control circuit the same way as the control signals from the sensor.

A slide switch is used to set the timer system into one of three modes: timer-off, timer-on, and reset. When the slide switch is in the timer-off condition, the lamp is operated by the pull chain or by the device's internal button. When the slide switch is in the timer-on condition, the control circuit will operate the power switch in accordance with the programming information in a storage device.

Programming of the timer system, by inserting markers in the storage locations of the storage device, is effected in two ways, fast programming and real-time programming. The fast-programming facet is not pertinent to the present application.

To place the timer system in its real-time programming mode, the slide switch is first moved to the reset position and then moved to the timer-on or timer-off position. Whenever the lamp is turned on or off by using the device's internal button during the next twenty-four hours, an on or off marker, as the case may be, is set automatically. The markers are delivered to storage locations of the storage device respectively corresponding to ninety-six intervals (four fifteen-minute intervals during a twenty-four hour period). The patent mentions in passing that random access memory (RAM) is possible. In the main embodiment, programming is only effected by operation of the device's internal button and not by operation of the lamp's pull chain.

When the slide switch is in the timer-off position, operation of the device's internal button or the lamp chain will operate the lamp, and the lamp will not be automatically controlled.

A second embodiment, depicted in FIG. 10, permits programming by operation of the lamp's pull chain. However, in this embodiment, the pull chain must be pulled twice in order to operate the lamp due to the hardware construction of the timer controller disclosed in this patent.

In the event of a power failure, and the resumption of power, the program in the Goldstein et al. controller will have been lost and the user will not have known about it.

SUMMARY OF THE INVENTION

An important object of the present invention is to provide an improved timing controller which is automatically programmed during the first day by turning an appliance on and off and thereafter executes the program by turning the appliance on and off at the same times each succeeding day.

Another object is to provide such a timing controller which is programmed by operation of the switch associated with the appliance so that the appliance can be used in the usual way during the first day.

Another object is to provide such a timing controller which is microprocessor controlled and in which the energization and de-energization of the appliance during the first day is stored in RAM.

Another object is to provide such a timing controller which will inform the user that a power failure has occurred by alternately turning the appliance on and off for a predetermined period of time, such as four hours.

Another object is to provide such a timing controller which is reset and is then placed in its learn mode with only one actuation of a manual switch.

In summary, there is provided a timing controller responsive to openings and closings, and the times thereof, of an appliance switch during an initial period of predetermined duration for thereafter automatically turning the appliance on and off at corresponding times during each succeeding period of predetermined duration, comprising a receptacle adapted to receive the plug of the appliance, electronic switch means having a control input, the electronic switch means being in the closed condition thereof when a control signal is applied thereto and in the open condition thereof in the absence of the control signal, means for coupling to a source of AC power, the receptacle and the electronic switch means and the means for coupling to a source of AC power being coupled in series in a series circuit, sensor means coupled to the series circuit and being responsive to an opening of the appliance switch to provide a first sensor signal and being responsive to a closing of the appliance switch to provide a second sensor signal, microprocessor means having an input coupled to the sensor means and an output coupled to the control input of the electronic switch means, the microprocessor means operating under stored permanent program to respond to first and second sensor signals for producing a temporary program containing information on the times during the initial period when the appliance is turned off and information on the times during the initial period when the appliance is turned on, the microprocessor means further operating under stored permanent program for responding to the temporary program to generate control signals and not to generate control signals, as the case may be, at the times during each succeeding period of predetermined duration when the appliance is to be respectively turned on and off.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, its construction and operation, and many of its advantages should be readily understood and appreciated.

FIGS. 3A and 3B depict a flow chart of the stored program under which the microprocessor of the present invention operates.

DESCRIPTION OF THE PREFERRED EMBODIMENT

Figure 1:
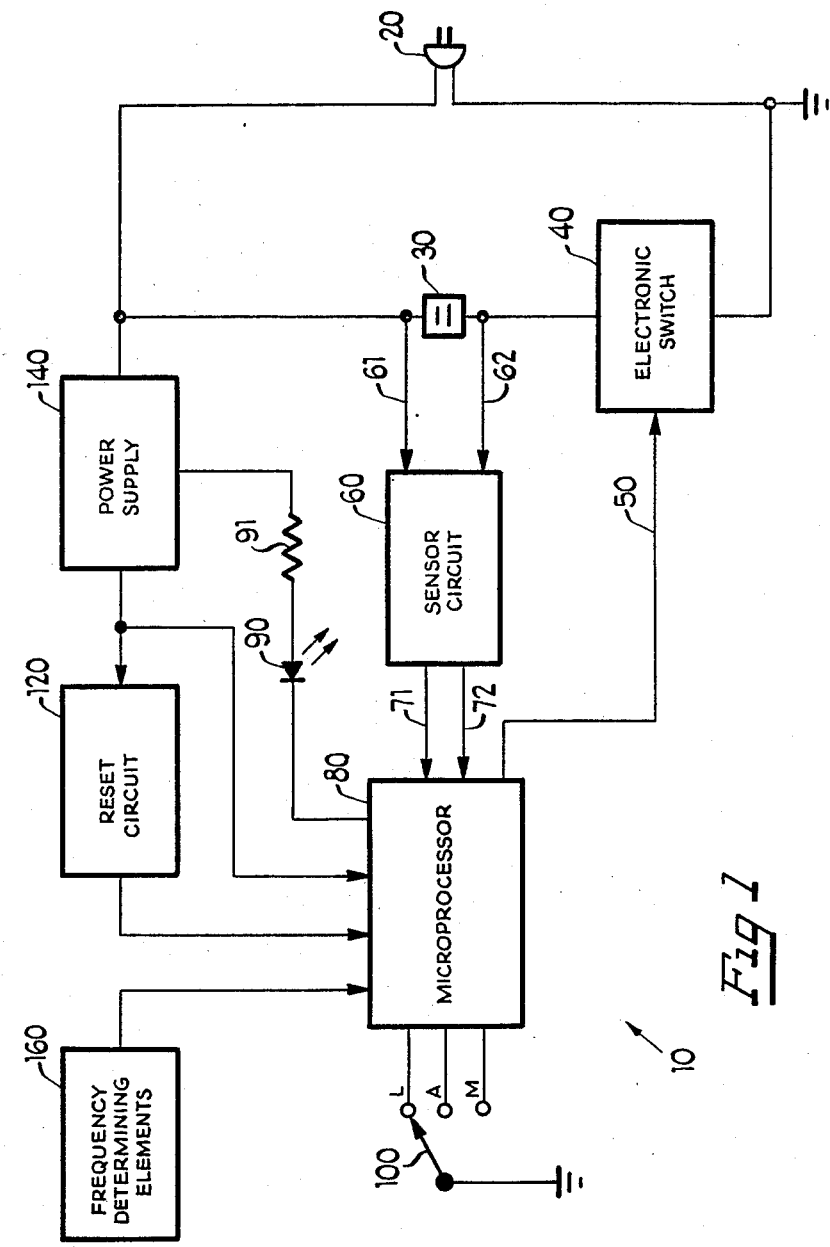
FIG. 1 depicts a block diagram of a microprocessor operated timing controller incorporating the features of the present invention.

Turning now to the drawings, and more particularly to FIG. 1 thereof, there is depicted a microprocessor operated timing controller 10 incorporating the features of the present invention. It automatically turns on and off an appliance such as a lamp. For an initial period of predetermined duration, such as twenty-four hours, the controller 10 monitors the appliance and "remembers" each time it is turned on and off during that period. Thereafter, the controller turns the appliance on and off each day at the same times those events occurred the first day.

The timing controller 10 includes a plug 20 which can be inserted into a conventional 110 VAC wall outlet. One terminal is connected to ground, and the other is hot. The 110 volt AC supply is in series with a receptacle 30 and an electronic switch 40. The appliance to be controlled is plugged into the receptacle 30. The electronic switch 40 is selectively opened and closed respectively to turn off and on the appliance.

The invention will be described in connection with a lamp plugged into the receptacle 30, but it is to be understood that the receptacle will also accommodate other appliances.

The electronic switch 40 is controlled by a microprocessor 80. When the microprocessor 80 develops a control signal, the electonic switch 40 closes to turn on the lamp. In the absence of the control signal, the electronic switch 40 is open, and the lamp is off. A sensor circuit 60 is connected in parallel with the receptacle 30 via conductors 61 and 62. Of course, the AC voltage appears on the conductor 61 whether or not the lamp is turned on. The conductors 71 and 72 from the sensor circuit 60 are connected to the microprocessor 80. The sensor circuit 60 converts the AC signal into a 60 hz square wave on the conductor 71, which square wave is used by the microprocessor for internal time keeping.

The sensor circuit 60 determines whether a lamp is on, off, or not in the circuit. When the lamp is on, the resistance between the conductors 61 and 62 is small. When the AC voltage on conductor 61 passes from negative to positive, or positive to negative, since the resistance is so low, the voltage on conductors 61 and 62 will be substantially the same. The conductors 71 and 72 are normally held high by the internal pullup of the microprocessor. When the lamp switch is closed and there is a light bulb present, the square waves on the conductors 71 and 72 cause the microprocessor to produce a control signal that closes the electronic switch 40 to turn on the lamp. Since there are two zero crossings per AC sine wave, the signals on conductors 71 and 72 cross zero one hundred twenty times per second if on. The electronic switch 40 is closed so rapidly that one cannot detect a flicker.

When the lamp is off, or not in the circuit, the 110 VAC remains on the conductor 61 and the square wave for internal time keeping continues to be generated. There is an open circuit between the conductors 61 and 62, so that the AC voltage is not present on the conductor 62. The signal on conductor 72 is held high due to internal pullup in the microprocessor 80. The absence of a logic low on conductor 72 signifies that the lamp is off or not in the circuit; thus the electronic switch 40 is open. In the manual mode, the electronic switch is closed.

For the first day (twenty-four hours), the controller is in a learn mode, and information on the times and changes in lamp state is stored. The microprocessor can only store a certain number of events, such as six. After six events have occurred, the controller 10 ignores subsequent events. Thereafter, during succeeding days, the timing controller automatically turns the lamp on and off at the same times it learned to do so while in the learn mode.

In an actual embodiment, the microprocessor 80 was a National Semiconductor COP 413L fabricated with N-channel MOS technology.

A three-position switch 100 allows the user to select one of three modes of operation: An "L" or "learn" position, an "A" or "automatic" position and an "M" or "manual" position.

When the switch 100 is moved to the "L" position, a timer is energized, and after a predetermined time such as 5 seconds has lapsed, the timing controller is reset and the temporary program that had previously been in the microprocessor is erased. In a particular embodiment, the timing controller is automatically placed in its "learn" mode wherein the microprocessor stores each change in state caused by operation of the lamp switch during the first day and also the time of each such operation. This information is in the form of a "temporary" program stored in RAM in the microprocessor. After the first day, the timing controller 10 automatically enters its automatic mode, so that during each succeeding day, the lamp is turned on and off, as the case may be, at the times the lamp was turned on and off during the first day.

When the switch 100 is in the "M" or "manual" position, the user can change the lamp state by operating the lamp switch, without affecting the temporary program, that is, the information stored in the microprocessor during the first day. With the switch 100 in the "M" position, the microprocessor does not generate control signals and the absence of control signals in accordance with the temporary program. Instead, control signals are continuously developed so that the electronic switch 40 is kept closed. Then, each time the lamp switch is closed, the lamp is turned on and each time the lamp switch is opened, the lamp is turned off.

To be automatically controlled after the initial period, whether the switch 100 is in the "L" position or the "A" position, the lamp switch must be closed.

The user can override the timing controller when in the automatic mode, without affecting the memory. This is done by cycling the lamp switch twice. For example, if the program has caused the lamp to turn on, the user can manually turn it off by operating the lamp switch off and then back on. This results in turning the lamp off while preserving the memory. Conversely, if the program has caused the lamp to turn off, the user can manually turn it on by operating the lamp switch off and then back on. This results in turning the lamp on without affecting the memory.

The switch 100 also has an "A" or "automatic" position. As previously explained, the timing controller 10 automatically executes the program after the first day has passed without moving the switch 100 from the "L" position. The user can if desired move the switch from the "L" position to the "A" position. The timing controller will execute the temporary program in the same way. However, as will be explained, in the case of a power failure, placing the switch 100 in the "A" position warns the user that the temporary program has been erased.

Whenever it is stated herein that the temporary program or memory in the microprocessor 80 is erased or cancelled, it is to be understood that the changes in state and the times of day of such changes are being erased, of course, not the main operating program.

To reprogram the timing controller, the switch 100 is moved to the "L" position. If it is already in the "L" position, then it must be moved first to the "A" or "M" positions and then back to the "L" position. In the "L" position, the timing controller is reset meaning that the temporary program in the microprocessor 80 is erased. So that such erasure does not take place inadvertently, a delay is added. Reset does not take place until a predetermined delay time after the switch is placed in the "L" position. In an operating embodiment, that predetermined delay was five seconds. Thus, if the user inadvertently operates the switch 100 from the "A" position or the "M" position to the "L" position, he has five seconds to return to the "A" or "M" position without resetting the timing controller, that is, erasing the temporary memory.

An indicator 90, coupled to the microprocessor, blinks in the learn mode, is steady on when in the automatic mode and the lamp switch is closed, and is off at all other times. When the controller is in the automatic mode, an unlet indicator 90 means that the lamp switch is off or the lamp is burned out.

If a power interruption occurs while the switch 100 is in the "A" position, the reapplication of power causes the timing controller to be placed in an oscillating mode, in which the lamp is turned on for four hours and off for four hours in a continuous cycle. This indicates to the user that a power outage has occurred and the temporary memory has been erased. This feature is triggered by a reset circuit 120, the input to which is derived from the power supply 140. The power supply 140 provides a regulated voltage to all the components of the timing controller 10. The power supply 140 can withstand brief power interruptions without affecting the memory. In an actual embodiment, a 15 second interruption did not affect the memory. If the power interruption is longer, the reset circuit 120 applies a reset signal to the microprocessor. The microprocessor then operates under stored program to turn the lamp on for four hours and off for four hours in a continuous cycle when power is reapplied.

Incorporated in the microprocessor 80, is a single pin RC controlled Schmidt trigger oscillator, having a frequency determined by the frequency determining elements 160.

Figure 2:
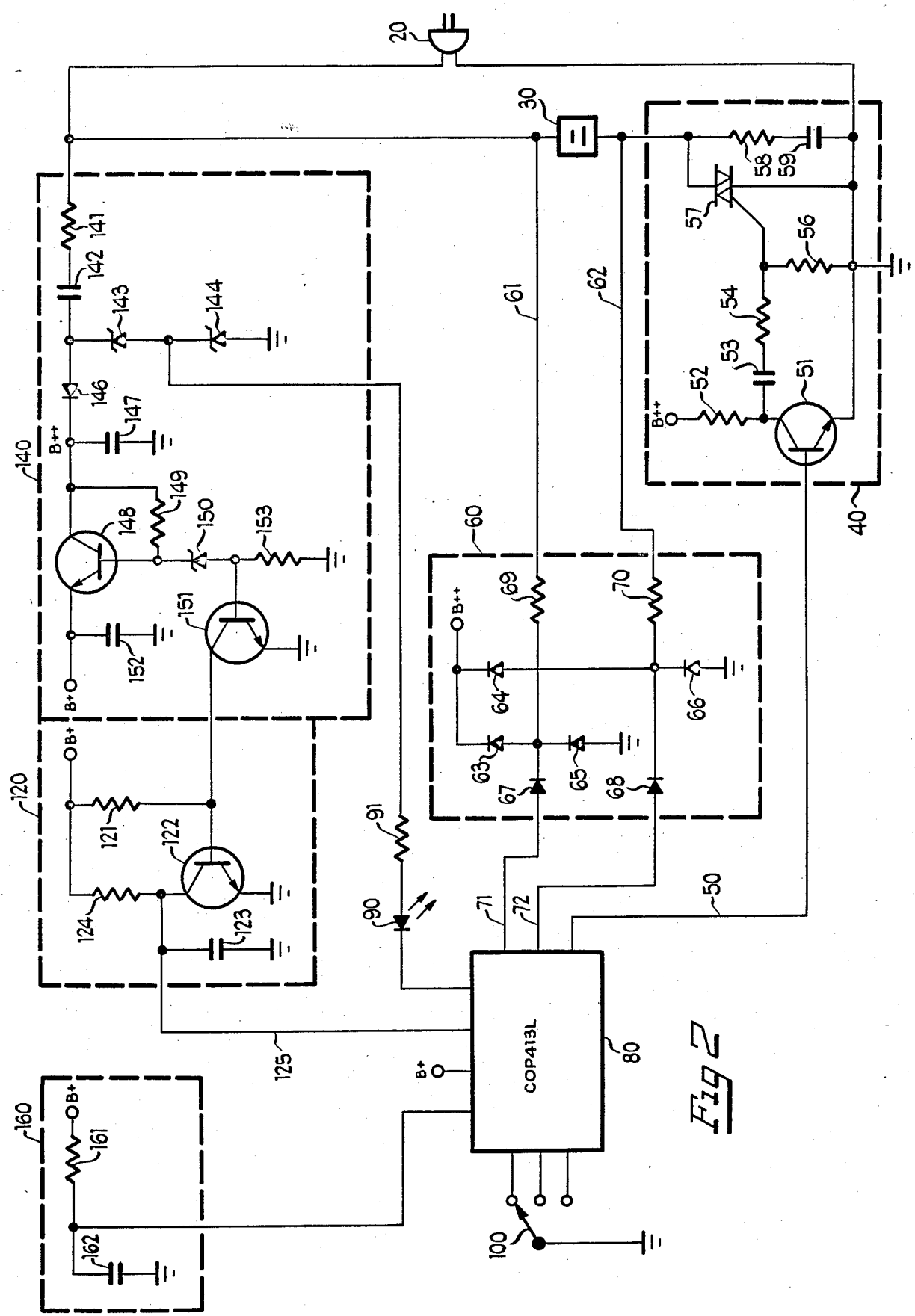
FIG. 2 depicts a schematic diagram of the timing controller.

Depicted in FIG. 2, is a detailed schematic of the timing controller. The lamp to be controlled is plugged into receptacle 30. For the lamp to be on, or energized, the electronic switch 40 is closed by a control signal on conductor 50.

When the voltage on the conductor 50 is low, the transistor 51 is non-conductive, and a capacitor 53 is charged to 14.5 volts from B++ through resistors 52, 54, and 56. A control signal on the conductor 50 saturates the transistor 51, causing the stored voltage in the capacitor 53 to be discharged. This sinks current from the gate of triac 57 at a rate determined by the value of the resistor 54. The triac 57 is gated on about 30° after the AC line voltage passes a zero crossing. This sequence is repeated at each zero crossing. The resistor 56 helps to protect the triac 57 from false triggering due to noise on the line. The resistor 58 and the capacitor 59 are in parallel with triac 57, and provide a snubber network for protection thereof from transients on the line.

If an extension cord is inserted between receptacle 30 and the lamp cord, a false indication that the lamp is on may occur, due to extension cord capacitance. The capacitor 59 prevents such a false indication.

The sensor circuit 60 is connected in parallel with the receptacle 30. The sensor circuit 60 provides, on the conductor 71, a 60 hz square wave synchronized to the zero crossings.

Resistor 69 current limits the line voltage across clipping diodes 63 and 65. Diode 63 clamps the positive swing of the voltage across the 5.1 zener diode 150, the resistor 149 and the base-emitter junction of the transistor 151. The diode 65 clamps the negative swing to ground minus the drop across The 60 hz square wave extends between +14.5 volts and −0.6 volts. Diode 67 provides a voltage drop to shift the negative portion of the input to approximately ground. The diode 67 prevents over voltage at the input which is held high by internal pullup. On the positive half cycle, the voltage on the conductor 71 is the same as B+, approximately 5.1 volts.

The sensor circuit detects zero crossings of the 110 AC voltage on conductor 61. There are two zero crossings per period or 120 per second in a 60 hz voltage. At a zero crossing and during the negative half cycle, the conductor 61 is at ground. The diode 67 is forward biased and conducts, providing a logic low to the microprocessor on conductor 71. On the positive half cycle, the diode 67 is reverse biased. The signal at the conductor 71 is held high due to the microprocessor's internal pullup.

In any mode, when the lamp is on, there is negligible resistance, provided by the lamp, between the conductors 61 and 62. Thus, at zero crossing, the signals at the conductors 61 and 62 are substantially the same. As stated earlier, the conductors 71 and 72 are normally held high by the internal pullup of the microprocessor. When the lamp is on, a logic low appears on each of the conductors 71 and 72. When this occurs, the microprocessor closes the electronic switch 40 for a short period of time to cause the lamp to turn on. Since there are two zero crossings per period, the signals at conductors 71 and 72 are examined, and the electronic switch 40 closes one hundred twenty times per second if on.

A logic low on the conductor 72 indicates to the microprocessor that the lamp is on. A logic high indicates that the lamp is off or not in the circuit, due to the internal pullup of the microprocessor.

When the lamp is on, a short time after a zero crossing, the voltage on each of the conductors 61 and 62 is the same. The diode 68 is forward biased, applying a logic low to the conductor 72. When the lamp is off or not plugged into the receptacle 30, the conductors 61 to 62 are isolated; therefore no signal is applied to the anode of the diode 68. The diode 68 is shut off and the signal at the conductor 72 is held high due to the internal pullup of the microprocessor. Thus, the electronic switch 40 is de-energized.

The indicator 90 is a light emitting diode that blinks in the learn mode, is steady on in the automatic mode and the lamp switch is closed, and is off at all other times. The current limiting resistor 91 is connected to the anode of the 5.1 zener diode 144. Therefore the storage time of the capacitor 147 is not affected when a brief power interruption occurs.

The reset circuit 120 includes resistors 121 and 124, a transistor 122 and a capacitor 123. During normal operation, current flows through the resistor 149 to the 5.1 volt zener diode 150 and the base-emitter junction of the transistor 151. This establishes roughly 5.7 volts at the base of the transistor 148. The output voltage at the emitter of transistor 148, is about 5 volts. Under normal conditions, the transistor 151 is saturated, thereby holding the transistor 122 off and allowing the reset circuit output to become high.

If the input voltage drops, the zener diode 150 is rendered nonconductive as is the transistor 151. The transistor 122 turns on and causes the reset circuit output to become low which constitutes a reset signal. When sufficient input voltage is reapplied, the transistor 151 turns on and the transistor 122 turns off. The time constant of the capacitor 123 and the resistor 124 allows the reset circuit output to slowly rise to B+, producing a reset signal.

The specifications of the microprocessor require that for a valid reset, the reset output on conductor 125 must be low for three instruction cycles. The microprocessor executes individual instructions at a rate of approximately 16 microseconds. For a valid reset, the line must be held low for about 48 microseconds. When the transistor 122 conducts, the capacitor 123 is discharged. The reset output on conductor 125 becomes high as the capacitor 123 charges through the resistor 124. The time constant of resistor 124 and capacitor 123 is long enough that the reset line will not reach a logic high until at least three instruction cycles have passed. Thus the reset circuit prevents the microprocessor from entering an unknown and unpredictable state. When the reset circuit is activated, while in the automatic mode, the microprocessor automatically executes the stored program that turns the lamp on for four hours and off for four hours in a continuous cycle, when power is reapplied.

The power supply 140 provides a regulated voltage. The resistor 141 and the capacitor 142 in series, current limit the line voltage to a safe operating level. A regulated 14.5 volt supply is provided by the series combination of a 10 volt zener diode 143 and a 5.1 volt zener diode 144. The diode 146 provides a half wave rectification and the capacitor 147 furnishes filtering and capability for storing energy when the AC voltage is interrupted. The capacitor 147 allows the timing controller 10 to continue operation during brief power interruptions, without loss of the memory.

An emitter follower voltage regulator for a 5.1 volt supply is made up of the transistor 148, the resistor 149, and the 5.1 volt zener diode 150. The capacitor 152, connected between the emitter of transistor 148 and ground, is a filter for noise on the supply line.

The frequency determining elements 160 are the resistor 161 and the capacitor 162. The microprocessor is configured with a single pin RC controlled Schmidt trigger oscillator. The resistor 161 and the capacitor 162 provide an oscillation frequency of approximately 250 Khz. to the microprocessor. The instruction cycle time is ¼ the clock frequency providing an instruction time of approximately sixteen microseconds, as stated in the specifications for this microprocessor.

Turning to FIGS. 3A and 3B, the flow chart depicted therein will be used to explain the stored permanent program under which the microprocessor operates. The timing controller 10 is operable when plugged into an external AC power supply.

The first inquiry made is whether or not the microprocessor is in the test mode. If the answer is yes, an internal routine exercises all of the inputs and outputs. The results tell the test engineer whether the chip itself is working properly. If the answer is no, the microprocessor automatically turns the lamp on for four hours and off for four hours in a continuous cycle, if the switch is in the learn or automatic position. As a convenient starting point, this program assumes the microprocessor is in the automatic mode before the position of the switch 100 is examined.

The microprocessor operates in the learn mode, the manual mode, or the automatic mode. The mode and position of the switch 100 are usually the same except under two circumstances. First, if the switch 100 is in the learn position and twenty-four hours have elapsed or six events have been programmed, then the automatic mode is entered even though the switch 100 is in the learn position. Secondly, in the automatic or manual mode when the switch 100 has just been moved into the learn position before five seconds have elapsed.

The first inquiry when the microprocessor is in actual use by a user, is whether the microprocessor is in the learn mode. The learn mode is entered when the switch 100 is in the learn position. If yes, the indicator 90 blinks. The next inquiry is whether twentyfour hours has elapsed. If yes, the automatic mode of operation is entered, and the mode of operation and the position of the switch 100 is examined once every second by a binary counter. If no, the next inquiry is whether the user has turned the lamp on or off. If no, the microprocessor continues to examine the mode and position of the switch 100 once every second. If yes, the lamp charge in state is changed, and the time and new lamp state is stored in the memory. The next inquiry is whether six events have been recorded. If no, the mode and position of switch 100 is examined once every second by the binary counter. If yes, the automatic mode is entered and the mode and position of switch 100 is examined once every second by the microprocessor.

If the microprocessor is not in the learn mode, the next inquiry is whether the microprocessor is in the manual mode. If yes, the manual mode is entered, the indicator 90 is turned off, and the lamp is turned on.

The next inquiry is whether the switch is in the learn position. If no, the manual mode of operation continues. The five second delay timer insures that if the user unintentionally changes the position of the switch 100, the user has five seconds to return to the automatic or manual position without clearing the memory. The position of switch 100 is then examined. If in the learn mode, the five second count down begins.

The next inquiry is whether five seconds has elapsed. If no, the position of switch 100 continues to be examined. If yes, the following sequence occurs: (1) the learn mode is entered; (2) the memory of the previously stored events is cleared; (3) the 24 hour clock is cleared and restarted; (4) the five second preset delay timer is activated (meaning that when the position of switch 100 is subsequently changed, the new mode will be entered at the next switch inspection, if the inhibit flag is not set); (5) the learn inhibit flag is set, and (6) the position of switch 100 is examined every second.

The automatic mode of operation is entered after twenty-four hours of learn-mode operation or six programmed events. If the microprocessor is not in the learn mode or in the manual mode, the next inquiry is whether the lamp switch is on. If no, the indicator 90 is off. If yes, the indicator 90 is on. The indicator 90 is steady on when in the controller is in the automatic mode and the lamp is switched on. When indicator 90 is off and the timing controller is in the automatic mode, the lamp switch is off, or the bulb is burned out, or a lamp is not plugged into the receptacle 30.

The next inquiry is whether the current or present time equals the event time. If yes, the event is executed or performed.

If yes or no, the next inquiry is whether the lamp has been "switched off and then back on". If yes, the lamp state is changed. This allows the user to manually override the programmed sequence at any time without affecting the memory. There are two possibilities. In the first case, if the lamp is on, the user can change the state of the lamp by manually switching the lamp off and then back on. This turns the lamp off. In the second case, if the lamp is off, the user can change the state of the lamp by switching it off and then back on, resulting in turning the lamp on.

If yes or no, the next inquiry is whether the switch 100 is in the learn position. This inquiry is made because the user may have or may not have operated the switch 100 to the automatic position from the learn position after twenty-four hours or six events have been programmed.

If he did not, the software requires the user to move the switch 100 out of learn position, and then back to the learn position for more than five seconds. This is a safety feature to prevent the unintentional erasure of the stored memory. Therefore, if the user wishes to reprogram a new sequence of events by entering the learn mode, the switch 100 must be operated from the automatic or manual position to the learn position for more than five seconds. In order to distinguish between the above two cases, it is necessary to detect whether the switch 100 has been operated to the automatic position during the automatic mode of operation. This is accomplished by setting a learn inhibit flag. The learn inhibit flag when set prevents the user from entering the learn mode from the automatic mode regardless of the position of the switch 100.

On the inception of the learn mode, the learn inhibit flag is set high. The learn inhibit flag has no effect on the operation at this time. This is simply a convenient point to set the microprocessor to a known state. After twenty-four hours or six events, the automatic mode of operation is entered.

If the answer to the inquiry as to whether the switch 100 is in the learn position is yes, the next inquiry is whether the learn inhibit flag has been set to one. If the switch 100 is in the learn position and the automatic mode has been entered, the learn inhibit flag is set even though the switch 100 is in the learn position. Thus, the automatic mode of operation continues.

If switch 100 is now moved to the automatic position, the switch is not in the learn position, and the learn inhibit flag is cleared. Therefore, the answer to the inquiry whether the learn inhibit flag is set, would be no. And the answer to the inquiry whether the switch is in the learn position would be no. The five second delay timer would be preset and the mode and position of the switch 100 would be examined once every second.

Assume the user operates the switch 100 back to the learn position after the automatic mode was entered. The answer to the inquiry of whether the learn inhibit flag is set, would be no. This is because the above example would have been completed and the learn inhibit flag would have already been cleared. If the answer to the next inquiry, whether the switch is in the learn position is yes, the learn mode countdown would begin. If five seconds have elapsed, the learn mode of operation is entered, the memory is cleared, the twenty-four hour clock is cleared and starts over, the five second timer is preset, the learn inhibit flag is set, and the mode and position of switch 100 is examined once every second.

While there has been described what at present is considered to be the preferred embodiment of the present invention, it will be understood that various modifications and alterations may be made therein without departing from the true scope of the invention which is intended to be covered by the claims appended hereto.

I claim:

1. A timing controller responsive to openings and closings, and the times thereof, of an appliance switch during an initial period of predetermined duration for thereafter automatically turning the appliance on and off at corresponding times during each succeeding period of predetermined duration, comprising receptacle means for receiving the plug of the appliance, electronic switch means having a control input, said electronic switch means being in the closed condition thereof when a control signal is applied thereto and in the open condition thereof in the absence of the control signal, means for coupling to a source of AC power, said receptacle and said electronic switch means and said means for coupling to a source of AC power being coupled in series in a series circuit, sensor means coupled to said series circuit and being responsive to an opening of the appliance switch to provide a first sensor signal and being responsive to a closing of the appliance switch to provide a second sensor signal, microprocessor means having an input coupled to said sensor means and an output coupled to the control input of said electronic switch means, said microprocessor means operating under stored permanent program to respond to first and second sensor signals for producing a temporary program containing information on the times during the initial period when the appliance is turned off and information on the times during the period of predetermined duration when the appliance is turned on, a single first sensor signal in response to a single closing of the appliance switch being sufficient to cause the temporary program to contain information on such closing, a single second sensor signal in response to a single opening of the appliance switch being sufficient to cause the temporary program to contain information on such opening, said microprocessor means further operating under stored permanent program for responding to the temporary program and to generate control signals and not to generate control signals, as the case may be, at the times during each succeeding period of predetermined duration when the appliance is respectively turned on and off.

2. The timing controller of claim 1, wherein the initial period is twenty-four hours.

3. The timing controller of claim 1, wherein said electronic switch means includes a triac having an anode and a cathode coupled in said series circuit and a gate electrode coupled to the output of said microprocessor means.

4. The timing controller of claim 3, wherein said electronic switch means further comprises a transistor having a base and an emitter and a collector, said base corresponding to said control input and said collector being coupled to the gate of said triac.

5. The timing controller of claim 1, wherein said sensor means provides a clock signal for said microprocessor means.

6. The timing controller of claim 1, wherein said sensor means has a pair of inputs respectively coupled to the terminals of said receptacle.

7. The timing controller of claim 6, wherein said sensor means has a pair of outputs, and said microprocessor means has a pair of inputs respectively coupled to the outputs of said sensor means.

8. The timing controller of claim 1, wherein said sensor means includes means for rectifying the signals from said series circuit.

9. The timing controller of claim 1, and further comprising manual switch means coupled to said microprocessor means and having a first position and a second position, said microprocessor means being responsive to said manual switch means being in the first position to create the temporary program during the initial period, and thereafter for responding to the temporary program and for generating control signals and not to generate control signals, as the case may be, at the times during each succeeding period of predetermined duration when the appliance is to be respectively turned on and off, said microprocessor means being responsive to said manual switch means being in the second position not to provide control signals in accordance with the temporary program and instead permit control signals and the absence thereof to be generated in accordance with operation of the appliance switch.

10. The timing controller of claim 9, wherein said microprocessor means further operates under stored permanent program to be responsive to said manual switch means being placed in the first position to automatically reset the microprocessor means and erase the temporary program stored therein and then automatically create a new temporary program during an initial period starting at that time.

11. The timing controller of claim 10, wherein operation of said manual switch means to the first position causes erasure of the temporary program only after a predetermined time has lapsed, whereby operation of said manual switch means back to the second position before expiration of the predetermined time prevents erasure of the temporary program stored therein, whereby inadvertent erasure of the temporary program stored in said microprocessor means is minimized.

12. The timing controller of claim 11, and further comprising indicator means coupled to said microprocessor means and being adapted to provide a first indication during the initial period of predetermined duration, and a second indication while said microprocessor means is generating a control signal, and a third indication at all other times.

13. The timing controller of claim 1, wherein said microprocessor means is further operated under stored program to respond to a power interruption and the subsequent reapplication of power to alternately provide a control signal for a first predetermined duration and the absence of the control signal for a second predetermined duration.

14. The timing controller of claim 13, wherein the first predetermined duration is approximately equal to the second predetermined duration.

15. The timing controller of claim 13, wherein each predetermined duration is four hours.

16. The timing controller of claim 1, wherein said microprocessor means includes RAM for storing the temporary program.

* * * * *